United States Patent
Lin et al.

(10) Patent No.: US 11,151,951 B2
(45) Date of Patent: Oct. 19, 2021

(54) ELECTRO-PHORETIC DISPLAY AND DRIVING METHOD THEREOF

(71) Applicant: E Ink Holdings Inc., Hsinchu (TW)

(72) Inventors: Feng-Shou Lin, Hsinchu (TW); Chen-Kai Chiu, Hsinchu (TW); Chih-Yu Cheng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/233,129

(22) Filed: Dec. 27, 2018

(65) Prior Publication Data

US 2019/0213959 A1 Jul. 11, 2019

(30) Foreign Application Priority Data

Jan. 5, 2018 (TW) .................... 107100413
Jun. 7, 2018 (TW) .................... 107119645

(51) Int. Cl.
*G09G 3/34* (2006.01)
*G02F 1/1685* (2019.01)
*G02F 1/167* (2019.01)

(52) U.S. Cl.
CPC ............ *G09G 3/344* (2013.01); *G02F 1/167* (2013.01); *G02F 1/1685* (2019.01); *G09G 2310/061* (2013.01); *G09G 2310/068* (2013.01)

(58) Field of Classification Search
CPC ............ G09G 3/344; G09G 2310/061; G09G 2310/068; G02F 1/1685; G02F 1/167
See application file for complete search history.

(56) References Cited

U.S. PATENT DOCUMENTS

| | | | |
|---|---|---|---|
| 6,753,844 B2 | 6/2004 | Machida et al. | |
| 2007/0080926 A1 | 4/2007 | Zhou et al. | |
| 2008/0276132 A1* | 11/2008 | Majewski | G06F 11/0757 714/55 |

(Continued)

FOREIGN PATENT DOCUMENTS

| | | |
|---|---|---|
| CN | 1791900 | 6/2006 |
| CN | 1839420 | 9/2006 |

(Continued)

OTHER PUBLICATIONS

"Office Action of Taiwan Counterpart Application", dated May 8, 2019, p. 1-p. 4.

(Continued)

*Primary Examiner* — Alexander Eisen
*Assistant Examiner* — Nathaniel P Brittingham
(74) *Attorney, Agent, or Firm* — JCIPRNET

(57) ABSTRACT

An electro-phoretic display including a display panel and a driving circuit. The display panel is configured to display image frames. The driving circuit is coupled to the display panel. The driving circuit is configured to drive the display panel to display the image frames according to a driving signal. The driving signal includes a first pulse and a second pulse. A driving period of the driving signal includes a first stage, a second stage and a driving stage in sequence. The first pulse is located before the driving stage, and the second pulse is located in the second stage. The pulse width of the first pulse is larger than that of the second pulse. In addition, a driving method of an electro-phoretic display is also provided.

6 Claims, 3 Drawing Sheets

(56) References Cited

U.S. PATENT DOCUMENTS

| | | | |
|---|---|---|---|
| 2008/0303780 A1* | 12/2008 | Sprague | G09G 3/344 345/107 |
| 2011/0007381 A1 | 1/2011 | Paolini, Jr. et al. | |
| 2013/0194250 A1 | 8/2013 | Amundson et al. | |
| 2014/0078035 A1* | 3/2014 | Sato | G09G 3/344 345/107 |
| 2014/0232629 A1 | 8/2014 | Aoki et al. | |
| 2014/0266998 A1* | 9/2014 | Ogawa | G09G 3/344 345/107 |
| 2014/0313566 A1 | 10/2014 | Du et al. | |
| 2017/0148372 A1 | 5/2017 | Emelie et al. | |
| 2018/0286318 A1* | 10/2018 | Yi | G09G 3/34 |
| 2019/0213959 A1* | 7/2019 | Lin | G02F 1/167 |
| 2019/0331979 A1* | 10/2019 | Takada | G09G 3/344 |

FOREIGN PATENT DOCUMENTS

| | | |
|---|---|---|
| CN | 102456323 | 5/2012 |
| CN | 102592549 | 7/2012 |
| CN | 105684072 | 6/2016 |
| CN | 107342057 | 11/2017 |
| KR | 20100081857 | 7/2010 |
| TW | 200527103 | 8/2005 |
| WO | 2005073949 | 8/2005 |

OTHER PUBLICATIONS

"Office Action of China Counterpart Application", dated Apr. 20, 2020, p. 1-p. 7.
"Notice of Allowance of China Counterpart Application," dated Aug. 3, 2021, pp. 1-5.

\* cited by examiner

ELECTRO-PHORETIC DISPLAY AND DRIVING METHOD THEREOF

CROSS-REFERENCE TO RELATED APPLICATION

This application claims the priority benefit of Taiwan application serial no. 107100413, filed on Jan. 5, 2018 and Taiwan application serial no. 107119645, filed on Jun. 7, 2018. The entirety of the above-mentioned patent application is hereby incorporated by reference herein and made a part of this specification.

BACKGROUND OF THE INVENTION

Field of the Invention

The invention is related to a display and a driving method thereof, and particularly to an electro-phoretic display and a driving method thereof.

Description of Related Art

In recent years, since an electronic paper display device has the advantages of being light, durable and environmental because of low-power consumption characteristic, it has been commonly applied to e-reader (e.g., electronic book, electronic paper) or other electronic elements (e.g., electronic tag). Take the electro-phoretic display as an example, the charged particles thereof rely on the embedded electrical field to move and are also affected by gravitational field. Therefore, when the electro-phoretic display is placed in a vertical manner, relatively weak gravity affects the distribution of electro-phoretic particles therein during the long driving process and thus affecting the display state. Take current situation as an example, in vertical driving process, the main factor which causes the black frame to be yellowish is that white electro-phoretic particles and yellow electro-phoretic particles are continuously driven, which causes the yellow electro-phoretic particles to sink down to the display end and thus affecting the display effect of black color.

SUMMARY OF THE INVENTION

The invention provides an electro-phoretic display and a driving method thereof, capable of providing good display quality.

An electro-phoretic display of the invention includes a display panel and a driving circuit. The display panel is configured to display image frames. The driving circuit is coupled to the display panel. The driving circuit is configured to drive the display panel to display image frames according to a driving signal. The driving signal includes a first pulse and a second pulse. A driving period includes a first stage, a second stage and a driving stage in sequence. The first pulse is located before the driving stage, and the second pulse is located in the second stage. The pulse width of the first pulse is larger than that of the second pulse.

A driving method of an electro-phoretic display of the invention is configured to drive a display panel of the electro-phoretic display. The driving method includes driving a display panel with a first pulse in a driving period; and driving the display panel with a second pulse in a resetting stage. The driving period includes a first stage, a resetting stage and a driving stage in sequence. The first pulse is located before the driving stage, and the second pulse is located in the resetting stage. The pulse width of the first pulse is larger than the pulse width of the second pulse.

According to an embodiment of the invention, the first stage includes a balancing stage and a mixing stage in sequence.

According to an embodiment of the invention, the second stage is a resetting stage.

According to an embodiment of the invention, the first pulse is located in the balancing stage.

According to an embodiment of the invention, the pulse width of the first pulse is larger than two times the pulse width of the second pulse.

According to an embodiment of the invention, the pulse width of the first pulse is equal to ten times the pulse width of the second pulse.

According to an embodiment of the invention, the pulse width of the first pulse is 200 milliseconds.

Based on the above, in the exemplary embodiments of the invention, the driving signal includes the first pulse located before the driving stage, thereby driving the electro-phoretic display with the driving signal and providing good display quality.

In order to make the aforementioned features and advantages of the invention more comprehensible, embodiments accompanying figures are described in detail below.

DESCRIPTION OF EMBODIMENTS

To facilitate understanding, descriptions of the invention are given with reference to the exemplary embodiments illustrated with accompanied drawings. In addition, whenever possible, identical or similar reference numbers stand for identical or similar elements/components/steps in the figures and the embodiments.

Figure 1:
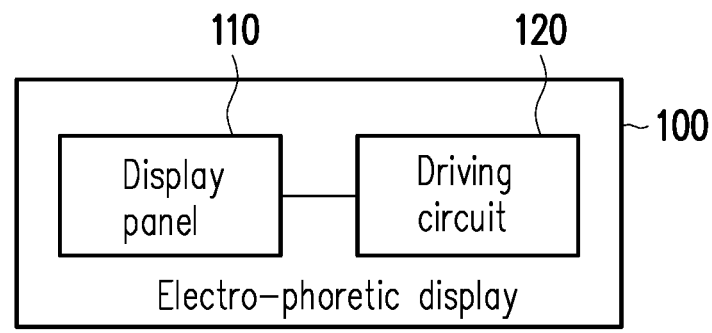
FIG. 1 is a block diagram illustrating an electro-phoretic display according to an embodiment of the invention.

FIG. 1 is a block diagram illustrating an electro-phoretic display according to an embodiment of the invention. Referring to FIG. 1, an electro-phoretic display 100 includes a display panel 110 and a driving circuit 120. In the embodiment, the electro-phoretic display 100 is a colored electro-phoretic display facility, and has a display effect of displaying at least three colors. The display panel 110 includes a plurality of pixels, and the pixels respectively correspond to a plurality of electro-phoretic units arranged in arrays, wherein the electro-phoretic units include electro-phoretic particles of three colors. In the embodiment, the driving circuit 120 is configured to provide a driving signal to the display panel 110, thereby driving the plurality of electro-phoretic particles in the electro-phoretic units. In the embodiment, the driving circuit 120 drives the electro-phoretic particles to move in the electro-phoretic units by applying voltage such that each of the pixels of the display panel 110 can respectively display black color, white color, gray level or a specific color. In the embodiment, the electro-phoretic units are, for example, microcup structures and have white electro-phoretic particles, black electro-phoretic particles and colored electro-phoretic particles. In each of the embodiments of the invention, the colored electro-phoretic particles refer to a third electro-phoretic particle, and the colored electro-phoretic particles may be, for example, red electro-phoretic particles or yellow electro-phoretic particles, but not limited thereto.

Figure 2:
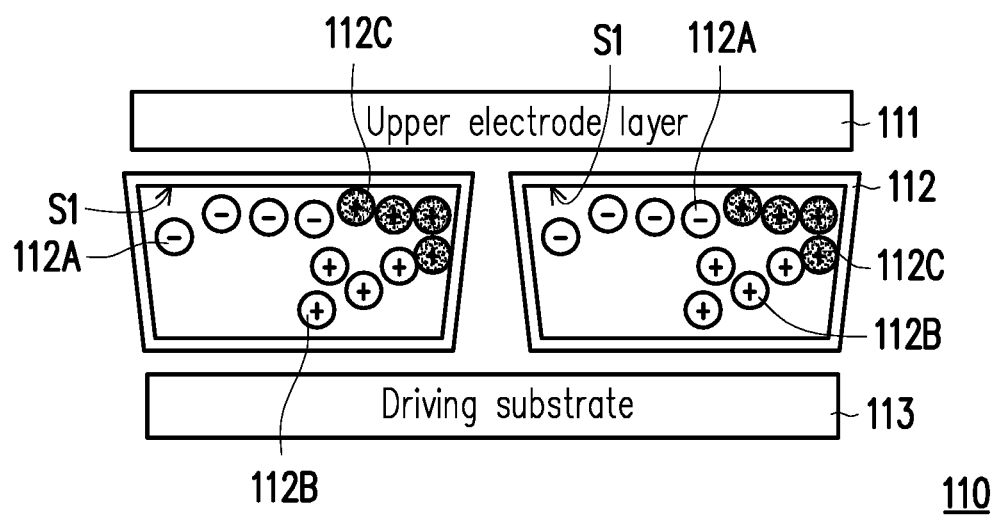
FIG. 2 is a schematic view of a display panel according to an embodiment of the invention.

FIG. 2 is a schematic view of a display panel according to an embodiment of the invention. Referring to FIG. 1 and FIG. 2, FIG. 2 is a schematic view of a plurality of electro-phoretic units of the display panel 110. In the embodiment, a single pixel of the display panel 110 includes an upper electrode layer 111, a plurality of electro-phoretic units 112 and a driving substrate 113. The electro-phoretic units 112 are disposed between the upper electrode layer 111 and the driving substrate 113, and a display side S1 of the electro-phoretic units 112 is close to the upper electrode layer 111. In the embodiment, the upper electrode layer 111 is, for example, a transparent electrode layer. The electro-phoretic units 112 respectively include a plurality of first electro-phoretic particles 112A, a plurality of second electro-phoretic particles 112B and a plurality of colored electro-phoretic particles 112C (i.e., third electro-phoretic particle). The number of the electro-phoretic units 112 and the number of the electro-phoretic particles of the electro-phoretic units 112 are not limited to the illustration shown in FIG. 2. The driving substrate 113, for example, includes a driving transistor and the driving transistor is configured to receive the driving signal, thereby driving the first electro-phoretic particles 112A, the second electro-phoretic particles 112B and the colored electro-phoretic particles 112C of the electro-phoretic units 112 to move in the electro-phoretic units 112.

In the embodiment, the first electro-phoretic particles 112A may be, for example, negatively charged white electro-phoretic particles. The second electro-phoretic particles 112B may be, for example, positively charged black electro-phoretic particles. The colored electro-phoretic particles 112C may be, for example, positively charged red electro-phoretic particles or positively charged yellow electro-phoretic particles. In the embodiment, the charge capacity of the colored electro-phoretic particles 112C is lower than that of the second electro-phoretic particles 112B. In other words, when the driving substrate 113 is applied with negative voltage, the negatively charged first electro-phoretic particles 112A are moved toward the display side S1 of the electro-phoretic units 112. When the driving substrate 113 is applied with higher positive voltage, the positively charged second electro-phoretic particles 112B are moved toward the display side S1 of the electro-phoretic units 112. When the driving substrate 113 is applied with lower positive voltage, the positively charged colored electro-phoretic particles 112C are moved toward the display side S1 of the electro-phoretic units 112. The moving speed of the second electro-phoretic particles 112B and the colored electro-phoretic particles 112C are subject to the level of positive voltage applied to the driving substrate 113.

In the embodiment, when the driving circuit 120 drives the electro-phoretic units 112 to display a specific color (red color or yellow color), the driving circuit 120 drives the first electro-phoretic particles 112A (white color) to the display side S1 of the electro-phoretic units 112 first, and then drives the second electro-phoretic particles 112B (black color) to the display side S1 of the electro-phoretic units 112, and finally drives the colored electro-phoretic particles 112C to the display side S1 of the electro-phoretic units 112. In the embodiment, the driving circuit 120 may provide the driving signal to the driving substrate 113 in four stages respectively; that is, the driving period of the driving signal includes a first stage, a second stage and a driving stage (or referred to as stacking stage) in sequence, wherein the first stage may be a balancing stage, a mixing stage or the balancing stage and the mixing stage in sequence. The invention provides no limitation to the state of the first stage. The second stage may be a resetting stage. The invention provides no limitation to the state of the second stage.

Figure 3:
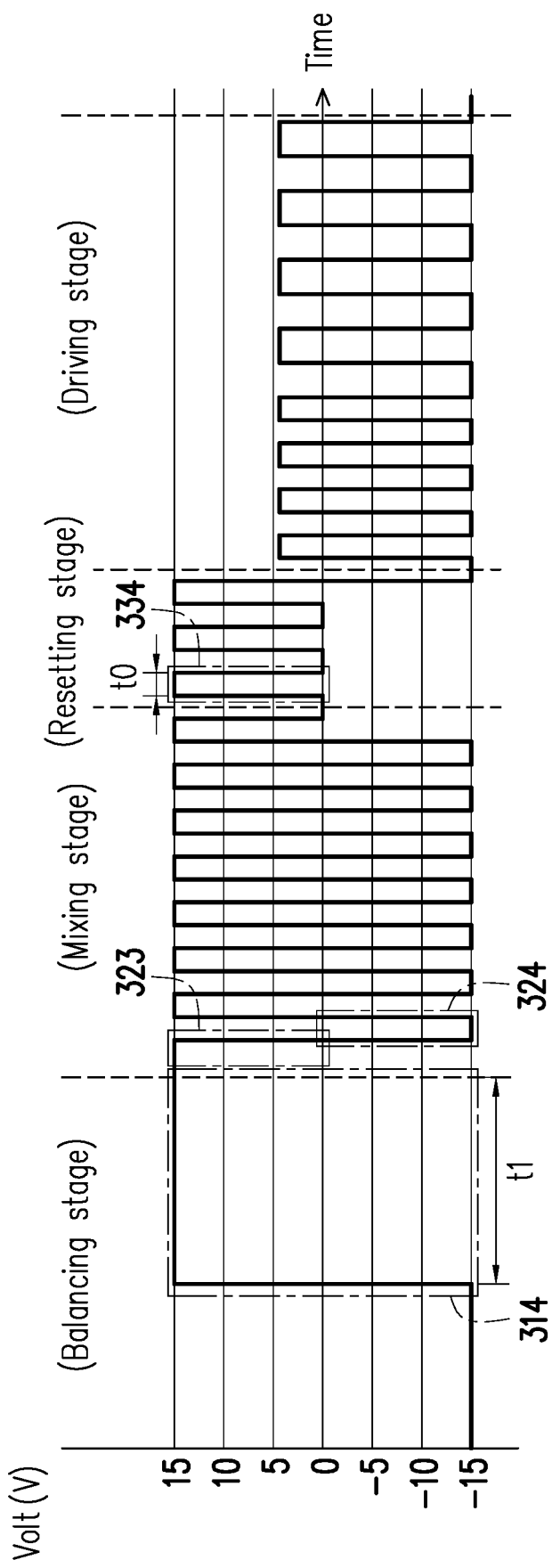
FIG. 3 is a waveform diagram of a driving signal according to an embodiment of the invention.

FIG. 3 is a waveform diagram of a driving signal according to an embodiment of the invention. Referring to FIG. 1 to FIG. 3, in the embodiment, the driving circuit 120 drives the second electro-phoretic particles 112B (black color) to the display side S1 of the electro-phoretic units 112 with the signal waveform shown in FIG. 3. Therefore, in the balancing stage, the driving circuit 120 provides the driving signal to the driving substrate 113 to balance the electrical charge of the second electro-phoretic particles 112B. In the embodiment, the driving signal in the balancing stage includes a first pulse 314 which is, for example, a +15V (voltage) signal having a pulse width t1. In one embodiment, the first pulse 314 may be a −15V (voltage) signal.

Thereafter, in the mixing stage, the driving circuit 120 provides the driving signal to the driving substrate 113 to uniformly disperse the first electro-phoretic particles 112A, the second electro-phoretic particles 112B and the colored electro-phoretic particles 112C. In the embodiment, the driving signal in the mixing stage includes a plurality of positive pulse signals 323 and a plurality of negative pulse signals 324 that are arranged alternately, and the positive pulse signals 323 are configured to drive the first electro-phoretic particles 112A, the negative pulse signals 324 are configured to drive the second electro-phoretic particles 112B and the colored electro-phoretic particles 112C. An amplitude of the positive pulse signals 323 is equal to an amplitude of the negative pulse signals 324. The positive pulse signal 323 is, for example, a +15V voltage signal. The negative pulse signal 324 is, for example, a −15V voltage signal.

In the resetting stage, the driving circuit 120 provides the driving signal to the driving substrate 113 to reset the second electro-phoretic particles 112B. In the embodiment, the driving signal in the resetting stage includes a plurality of second pulses 334, thereby driving the second electro-phoretic particles 112B to the display side S1 of the electro-phoretic unis 112. In the embodiment, the second pulse 334 is, for example, a +15V signal having a pulse width t0. However, in one embodiment, a reset signal, for example, includes 15 second pulses 334, and the pulse width t0 of each of the second pulses 334 is 20 milliseconds, but not limited thereto. In the embodiment, the pulse width of the first pulse is approximately equal to ten times the pulse width of the second pulse. In other words, the pulse width t1 is 200 milliseconds. The pulse width t1 of the first pulse 314 is larger than the pulse width t0 of the second pulse 334. In one embodiment, the pulse width of the first pulse is larger than two times the pulse width of the second pulse. In this manner, the second electro-phoretic particles 112B may be effectively pushed toward the display side S1 of the electro-phoretic units 112, thereby improving the display quality of the display panel 110.

In the embodiment of FIG. 3, although it is exemplified that the first pulse 314 is located in the balancing stage, the invention is not limited thereto. In other embodiments, the first pulse 314 may be located in the mixing stage or the resetting stage. In other words, the driving signal has the first pulse 314 located before the driving stage, thereby driving the display panel 110 with the driving signal and thus improving the display quality.

Figure 4:
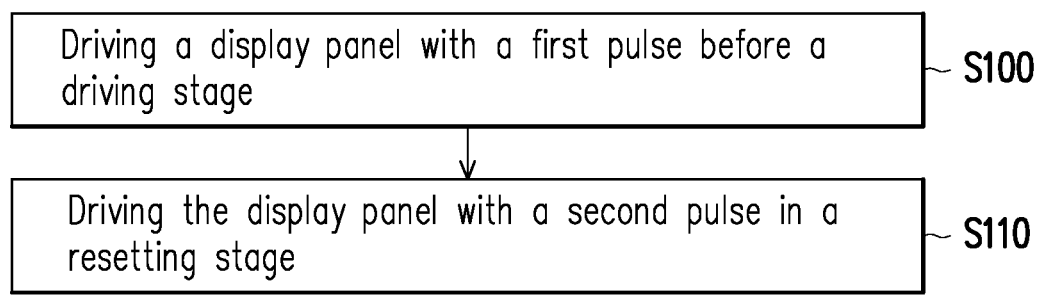
FIG. 4 is a flowchart of a driving method of an electro-phoretic display according to an embodiment of the invention.

FIG. 4 is a flowchart of a driving method of an electro-phoretic display according to an embodiment of the invention. Referring to FIG. 1 and FIG. 4, the driving method of the embodiment is, for example, adapted for the electro-phoretic display 100 in FIG. 1. In step S100, the driving circuit 120 drives the display panel 110 with the first pulse 314 before the driving stage, and drives the display panel 110 with the second pulse 334 in the resetting stage. Additionally, the descriptions in the embodiments of FIG. 1 to FIG. 3 provide sufficient teaching, suggestions and implementation details regarding the driving method of the electro-phoretic display of the embodiment.

In summary, in the exemplary embodiments of the invention, the driving signal includes the first pulse which may be located before the driving stage, for example, located in the balancing stage. Therefore, the driving signal in the balancing stage includes the first pulse having a pulse width larger than that of the second pulse. Such driving signal is used to drive the display panel such that the electro-phoretic display can provide a good display quality.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An electro-phoretic display, comprising:
a display panel, having a plurality of first electro-phoretic particles, a plurality of second electro-phoretic particles and a plurality of third electro-phoretic particles, and the display panel configured to display an image frame; and
a driving circuit, coupled to the display panel, configured to drive the display panel to display the image frame according to a driving signal,
wherein the driving signal comprises a first pulse and a second pulse, and a driving period of the driving signal comprises a first stage, a second stage and a driving stage in sequence, wherein the first stage comprises a balancing stage and a mixing stage in sequence, wherein the second stage is a resetting stage, and the resetting stage is between the mixing stage and the driving stage,
wherein the balancing stage includes a positive first voltage, the resetting stage includes a positive second voltage, the first pulse includes a negative first voltage, and the second pulse includes the positive second voltage,
wherein the first pulse is located before the driving stage, the second pulse is located in the second stage, and a pulse width of the first pulse is larger than a pulse width of the second pulse,
wherein the driving signal further includes a plurality of positive pulse signals and a plurality of negative pulse signals arranged alternately in the first stage,
wherein the driving circuit balances electrical charges of the plurality of second electro-phoretic particles through the first pulse in the balancing stage, and the driving circuit uses the plurality of positive pulse signals and the plurality of negative pulse signals in the mixing stage to uniformly disperse the plurality of first electro-phoretic particles, the plurality of second electro-phoretic particles and the plurality of third electro-phoretic particles.

2. The electro-phoretic display according to claim 1, wherein the first pulse is located in the balancing stage.

3. The electro-phoretic display according to claim 1, wherein the pulse width of the first pulse is equal to ten times the pulse width of the second pulse.

4. The electro-phoretic display according to claim 2, wherein the pulse width of the first pulse is 200 milliseconds.

5. A driving method of an electro-phoretic display, configured to drive a display panel of the electro-phoretic display, wherein the display panel has a plurality of first electro-phoretic particles, a plurality of second electro-phoretic particles and a plurality of third electro-phoretic particles, wherein the plurality of second electro-phoretic particles are a plurality of black electro-phoretic particles, the driving method comprising:
driving the display panel with a first pulse in a driving period, wherein the driving period comprises a first stage, a resetting stage and a driving stage in sequence, and the first pulse is located before the driving stage, wherein the first stage comprises a balancing stage and a mixing stage in sequence; and
driving the display panel with a second pulse in the resetting stage, and a pulse width of the first pulse is larger than a pulse width of the second pulse, wherein
in the first stage, the display panel is driven with a plurality of positive pulse signals and a plurality of negative pulse signals arranged alternately,
in the balancing stage, electrical charges of the plurality of second electro-phoretic particles are balanced with the first pulse, and in the mixing stage, the plurality of first electro-phoretic particles, the plurality of second electro-phoretic particles and the plurality of third electro-phoretic particles are uniformly dispersed by the plurality of positive pulse signals and the plurality of negative pulse signals,
in the resetting stage, the plurality of black electro-phoretic particles are reset with the second pulse.

6. The driving method of the electro-phoretic display according to claim 5, wherein the first pulse is located in the balancing stage.

* * * * *